United States Patent [19]

Guedj et al.

[11] 4,393,268
[45] Jul. 12, 1983

[54] MARKING SYSTEM USING ELASTIC SURFACE WAVES

[75] Inventors: Richard Guedj; Eugène Dieulesaint; Daniel Royer, all of Paris, France

[73] Assignee: Thomson-CSF, Paris, France

[21] Appl. No.: 265,325

[22] Filed: May 19, 1981

[30] Foreign Application Priority Data

May 23, 1980 [FR] France ................................ 80 11551

[51] Int. Cl.³ .............................................. G08C 21/00
[52] U.S. Cl. ....................................... 178/18; 434/416
[58] Field of Search .................... 178/18, 19; 434/408, 434/416; 346/21

[56] References Cited

U.S. PATENT DOCUMENTS 3,684,828  8/1972  Maher ................................... 178/18
3,806,642  4/1974  Veoth et al. ......................... 178/18

Primary Examiner—Stafford D. Schreyer
Attorney, Agent, or Firm—Cushman, Darby & Cushman

[57] ABSTRACT

The invention relates to data acquisition devices making it possible, by the use of elastic surface waves, to mark the coordinates of a stylus (7) making a line on the surface (2) of a piezoelectric plate (1).

The invention relates to a device in which the measuring surface (2) is provided with roughnesses or unevennesses of negligible size compared with the wavelength of the surface waves. The stylus (7) also comprises a member (8) for supplying a marking substance (10).

The invention is more particularly applicable to the remote transmission of graphic symbols and to the processing of digital data representing such symbols.

9 Claims, 9 Drawing Figures

MARKING SYSTEM USING ELASTIC SURFACE WAVES

BACKGROUND OF THE INVENTION

The invention relates to data acquisition systems making it possible to convert a line made by a stylus on a surface into electrical signals constituting a point by point plot of said line. It more particularly relates to systems using elastic surface waves propagating on the surface of a piezoelectric plate. The end of the inscribing or marking stylus detects the electrical field created by the elastic waves in the immediate vicinity of the piezoelectric plate surface. The time taken by the elastic surface waves to reach the stylus is measured in two propagation directions. This chronometric measurement makes it possible to evaluate the distances separating the stylus tip from two electromechanical transducers alternately emitting pulses, whose wave fronts scan the complete plate. The acquired data are in the form of a succession of pairs of precise numerical values, which together form a point of point plot of the movement imparted to the stylus. The processing of said numerical values makes it possible to characterize the inscription and pattern for identification purposes, whilst a digital transmission system can be used for remotely reproducing a random graphic. Such a system forms the subject matter of French Patent Application No. 76 20 765, filed on July 7, 1976 by THOMSON-CSF and entitled "Locating System using Elastic Surface Waves".

In conjunction with a visual display console the operator responsible for making a line on the piezoelectric plate can check what he is writing with the stylus. However, this inscription control procedure is disadvantageous, because the line which is observed does not result directly from the action of the stylus on the plate. The electronic means used for correctly displaying the movements of the inscription are sufficiently complex to limit the development of data acquisition systems using elastic surface waves. The control of the making of a line flush with the surface on which the stylus moves is very natural and simple is the stylus tip leaves an easily erasable visible material mark.

The known inscription supports are well suited to such a control, because they have a texture permitting the attachment of an ink or a solid friable material. However, it is not possible to consider covering a support propagating elastic surface waves with a sheet of paper, because such a juxtapositioning would have the effect of disturbing the punctiform electrical propagation and detection modes of said waves.

BRIEF SUMMARY OF THE INVENTION

The present invention relates to a marking system using elastic surface waves in which the free surface of the sheet has an area formed by roughness whose depth is significantly less than the wavelength of the elastic waves ensuring the attachment of a marking substance extracted from the stylus tip. This tip comprises a member supplying the said substance able to transmit an induced pulse when it touches the free surface at the passage point of vibratory pulses emanating from electromechanical transducer means.

BRIEF DESCRIPTION OF THE DRAWINGS

The invention is described in greater detail hereinafter relative to non-limitative embodiments and the attached drawings, wherein show.

DETAILED DESCRIPTION OF THE PREFERRED EMBODIMENTS

Figure 1:
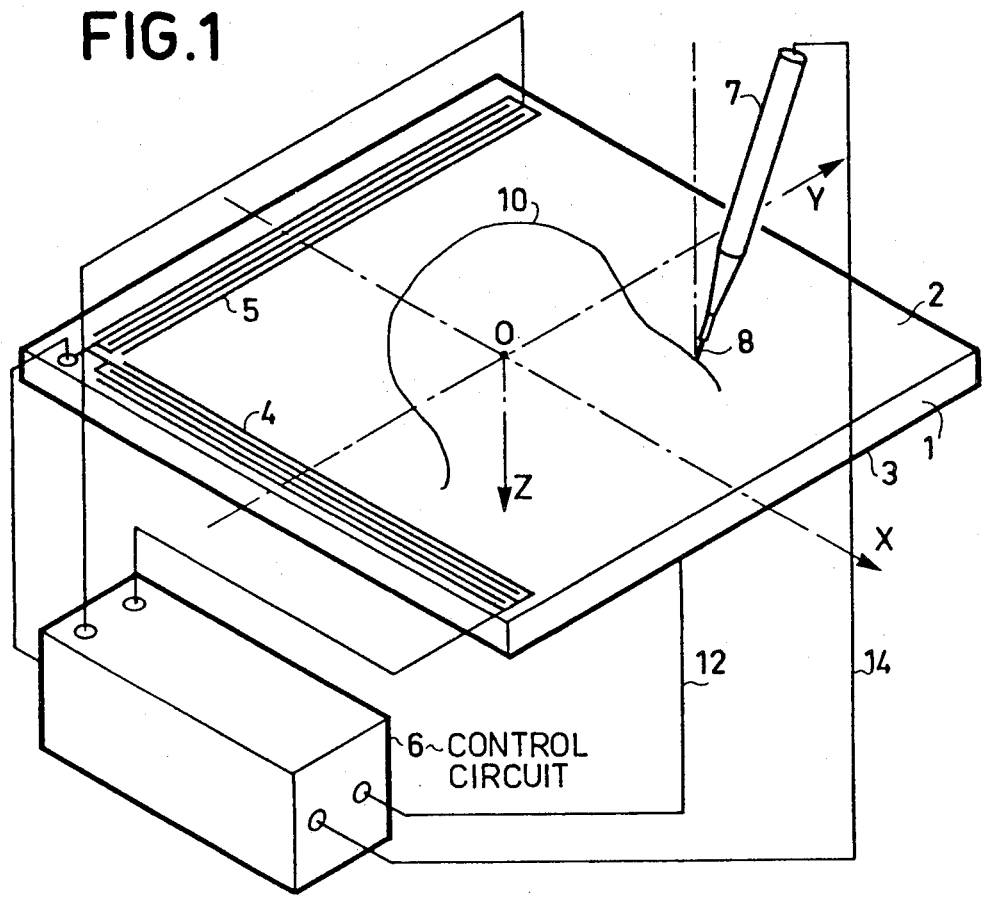
FIG. 1 an isometric view of a device for marking the coordinates of a line according to the invention.

The device of FIG. 1 essentially comprises a piezoelectric material plate 1, whose free face 2 carries on two edges parallel to the axes X and Y systems of electrodes 4 and 5 in the form of split-finger transducers. These transducers cooperate with the piezoelectric material of plate 1 so as to form electromechanical transducers 4 and 5 which emit elastic surface waves. The waves emitted by transducer 4 have linear wave fronts parallel to the axis X and propagate in the direction of axis Y.

Transducers 4 and 5 are electrically controlled by alternating pulses alternately produced by a control circuit 6. The sequence of the excitation pulses is selected in such a way that a wave front emitted by transducer 4 scans the complete free surface 2 before the wave front emitted by transducer 5 in turn scans said surface. The detection of the passage of the wave fronts takes place in punctiform manner by a stylus 7 which is sensitive to the electrical field created on surface 2 by elastic surface waves. The tip 8 of stylus 7 leaves a visible mark 10 of its path in the free surface 2. To this end the area of surface 2 not covered by the split-finger transducers 4 and 5 is ground in such a way as to permit the attachment of a marking substance extracted from tip 8. As a non-limitative example the stylus tip 8 can be formed by an electrically conductive graphite-treated member. This tip 8 collects an electrical voltage when it touches surface 2 at a passage point of the elastic surface waves. This voltage is transmitted by a flexible connection 14 to an input terminal of circuit 6. The lower face 3 of plate 1 can be ground so as to diffuse the elastic volume waves which propagate in the thickness and which could otherwise produce unwanted signals. This face can be metal coated to form a counter-electrode connected to circuit 6 by the earth connection 12.

Axis OZ forms with axis X and axis Y a trihedron, which can be trirectangular when the propagation of the elastic waves is isotropic in surface 2 or when it takes place in preferred directions (crystalline plate).

Plate 1 can advantageously be cut from a thin lithium niobate sheet. The transducer fingers can be constituted by aluminium deposits, whose fingers are spaced by a half-wavelength, i.e. $\lambda/2$. The wavelength reaches $\lambda = 160$ m for Rayleigh waves with a frequency of approximately 25 MHz. The thickness of plate 1 can be reduced to $2\lambda$ and the depth of the unevennesses on surface 2 can be a few microns. A tip diameter of 0.3 mm ensures an appropriate resolution for the same. The graphite deposit and the ground nature of surface 2 do not impede the propagation of the elastic surface waves. Grinding, which is carried out by means of a fine abrasive gives surface 2 a slightly diffusive appearance, but leaves its transparency.

Figure 2:
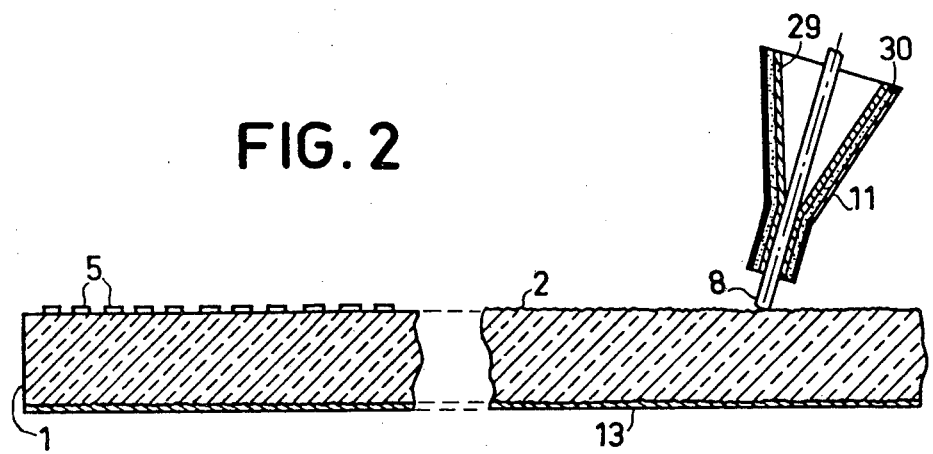
FIG. 2 a part sectional view of the device of FIG. 1.

FIG. 2 shows in part section stylus 7 and plate 1. The free face 2 is formed by microscopic unevennesses or roughnesses which are able to bring about the crumbling of the tip 8 of inscribing stylus 7. Tip 8 is contained in a metal sleeve 29 ensuring that it does not break under the effect of the pressure exerted on the stylus. The metal sleeve transmits the voltage induced by the electrical field which develops on the surface during the passage of the elastic surface waves. A metal coating 13 can constitute an earthed counter-electrode. To prevent the interception of unwanted signals sleeve 29 can be surrounded by an earthed metal covering 11. Covering 11 is insulated from sleeve 29 by a dielectric sheath 30. Metal covering 11 can serve as a counter-electrode when there is no covering 13.

Figure 3:
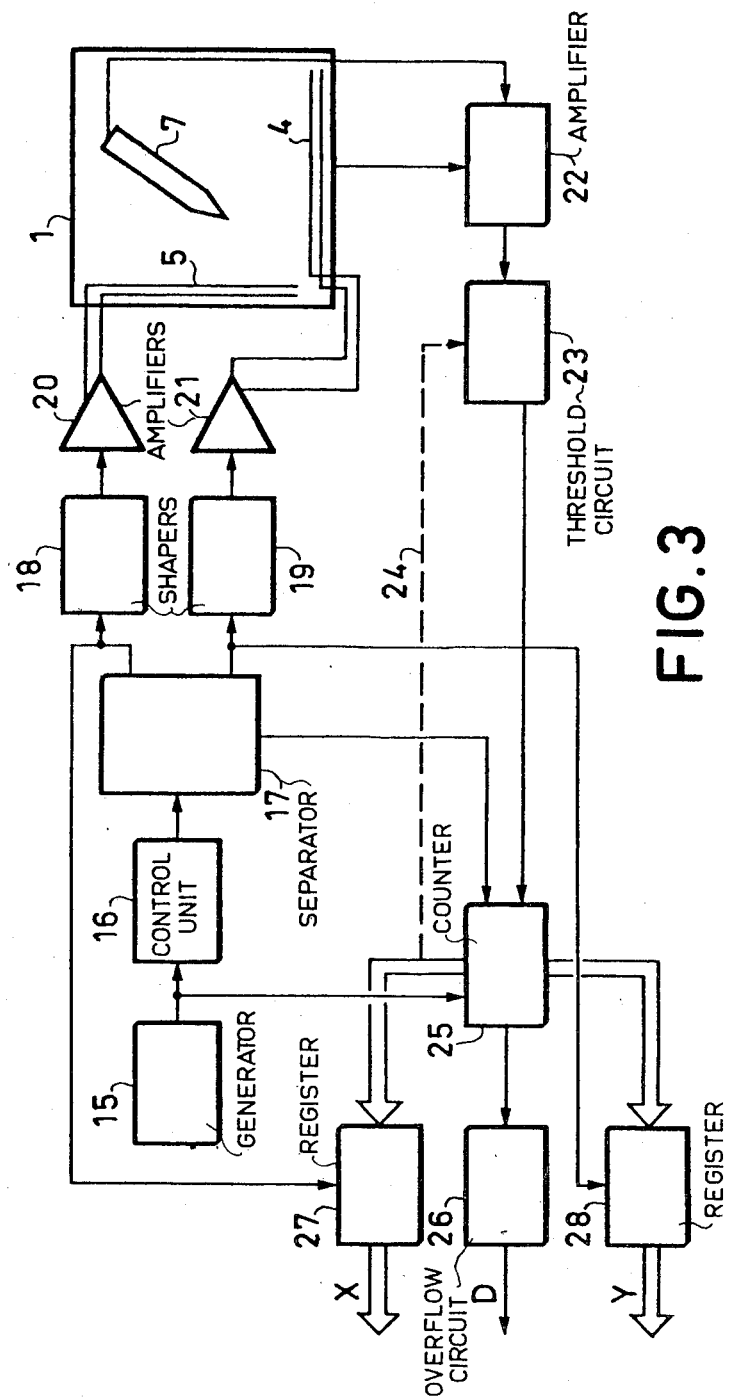
FIG. 3 a detailed circuit diagram of the device of FIG. 1.

FIG. 3 is a circuit diagram illustrating the main elements to be used in the excitation and measuring system 6. The main element is a counter 25 receiving at one of its inputs a train of isochronous pulses supplied by a generator 15. A control unit constituted by a pulse generator 16 determines the performance of the repeat measurements carried out alternately in directions X and Y. Generator 16 is synchronized by generator 15 and alternately supplies two groups of control pulses separated by separation circuit 17. The control pulses for starting the measurement along the X coordinate are applied to a pulse shaper 18, as well as to a memory register 27, which receives the digital data relative to the X coordinate. The control pulses for starting the measurement along the Y coordinate are applied to a pulse shaper 19 and simultaneously to the input of a second memory register 28 in which are temporarily stored the digital data relative to the Y coordinate. The starting of counter 25 is controlled by separation circuit 17 at the rate of 1 control pulse for each pulse transmitted to pulse shapers 18 and 19. The excitation signals alternately supplied by pulse shapers 18 and 19 are amplified by amplifiers 20 and 21. The latter respectively supply the transducers 5 and 4. The stoppage of counter 25 is brought about by the punctiform detection of the elastic surface waves when they reach tip 8 of stylus 7. To this end the detected signal from stylus 7 is applied via an amplifier 22 to a circuit 23 with a trip threshold. Circuit 23 controls the stoppage of counter 25. Counter 25 also has output terminals supplying digital data in the form of words of N bits. Said data are transmitted to registers 27 and 28 for temporary storage, transfer being by means of bus lines. The counter 25 can be provided with a supplementary output connected to an overshoot indicating device 26. The overshoot signal D indicates to the user that tip 8 is not placed on plate 1. An optional connection 24 can be made between the bus line and the detection circuit 23 so as to ensure that it does not control the stoppage of counter 25 very shortly after it has been started up. This inhibition takes account of the least significant bits appearing during the count in the bus line. It ensures that a capacitive coupling between transducers 4 and 5 and the tip of stylus 7 does not stop counter 25 in an untimely manner.

To better define the operating mode, information is provided hereinafter on a typical construction. Plate 1 is cut from a lithium niobate crystal and on the surface thereof are formed two split-finger transducers with sixteen linear fingers of approximate width 30 microns. The uniform spacing of the fingers is such that the centre transmission frequency is in a range from 25 to 30 MHz. The propagation directions which are not sensitive to the effect of acoustic birefringence correspond to phase velocities respectively equal to 4000 and 3700 meters per second. The repetition frequency of the pulses supplied by generator 15 is 40 MHz and that of the pulses controlling the start of counter 25 is approximately 2000 Hz, but can easily be increased to 5000 Hz or higher. The excitation signal supplied by amplifiers 20 and 21 is a voltage step of an amplitude of 20 volts. The trip threshold of circuit 23 is fixed at 0.5 v. and can determine the trip or start either on the first alternation of the signal detected by the stylus or on the envelope of the detected signal after rectification.

As soon as a control pulse is emitted by circuit 16 the separation circuit 17 controls the start of counter 25 and the bringing of memory register 27 or 28 into the wait condition. Simultaneously an elastic surface wave vibratory pulse is emitted by transducer 5 or 4. After a time slot proportional to the distance cleared by the vibratory pulse stylus 7 supplies a signal actuating threshold circuit 23 and the latter controls the stoppage of counter 25. If the stylus 7 is too close to the emitting transducer or is not positioned on plate 1, the counter is not stopped and an overshoot indication D is supplied.

In the considered example a step excitation signal is used, together with transducers having a regular structure and a uniform spacing. A first constructional variant consists of exciting the transducers by means of a Dirac pulse. However, operation can be improved by using pulse compression or correlation methods.

Figure 4:
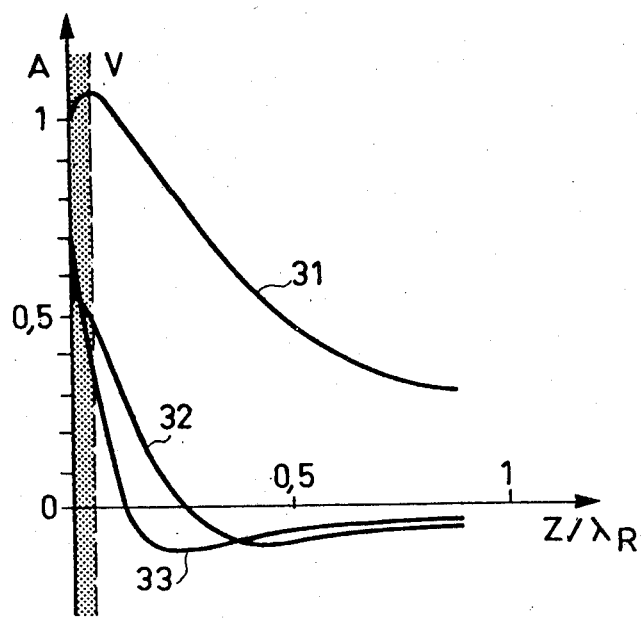
FIG. 4 an explanatory diagram.

As a non-limitative example FIG. 4 shows as a function of the depth Z expressed in wavelengths $\lambda_R$ and measured from surface 2 the amplitudes A of the longitudinal and transverse components of the elliptical vibration characterizing the propagation of elastic surface waves. Curve 33 shows the variation in the displacement in the propagation direction (longitudinal component) and curve 31 the decrease undergone by the displacement perpendicular to the surface of plate 1 (transverse component). Curve 32 shows the variation in the electrical potential on penetrating beneath the surface propagating the elastic surface waves.

These curves show that a microrelief not exceeding 1/20 of the wavelength has no significant action on the propagation of the elastic surface waves. Slight grinding leading to roughnesses of a few microns is completely adequate to make the initially smooth surface of the piezoelectric plate suitable for inscription. This grinding can be obtained by any appropriate means, e.g. by abrasion using a glass pad and an abrasive powder, whose grains have an average size of a few microns.

The diffusive nature of the ground surface can be utilized in order to render visible a real image projected on to the said surface.

Figure 5:
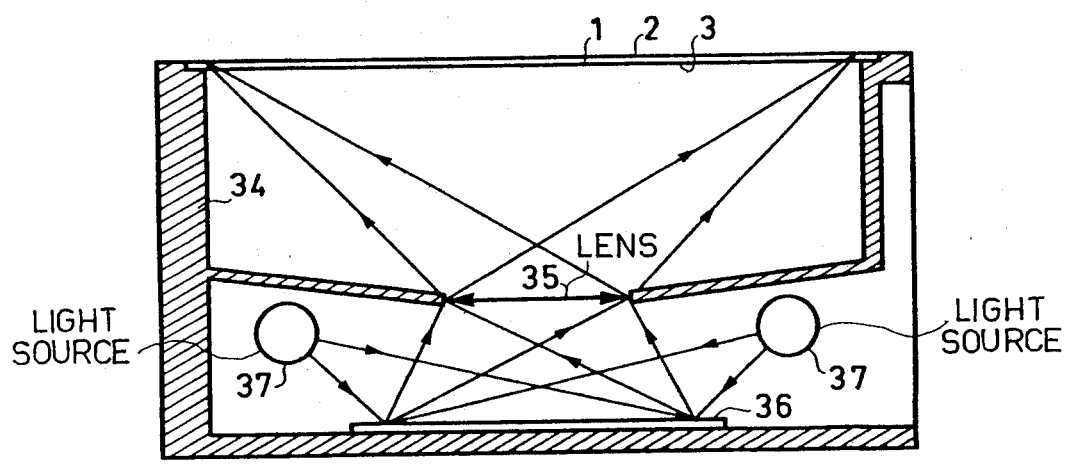
FIG. 5 a representative section of a first constructional variant of the device of FIG. 1.

FIG. 5 is a sectional view of a device for marking the coordinates of a line which can be copied on the free surface 2 of plate 1 by means of an inscribing stylus by following the optically projected contours. Support 34 of plate 1 comprises two superimposed chambers separated by a wall carrying a projection lens 35. The horizontal base of support 34 is illuminated by light sources 37. A document 36 can be placed on the base of support 34 facing lens 35 in order to project the image thereof on to surface 2. This image can be used as a guide for the line made with the stylus on surface 2. The fact that the stylus leaves a line of its passage prevents any omissions of marks when copying the image.

The erasure of the marks left on the ground surface 2 can be performed as easily as if it were an ordinary sheet of paper. The material left by the stylus does not impede the propagation of the elastic surface waves, because said deposit is very small and its electrical resistance leads to no short-circuiting effect liable to prejudice the punctiform detection of the voltage induced by the electrical field accompanying the propagated wave.

Without passing beyond the scope of the invention it is possible to adapt other forms for the construction of the stylus. Thus, instead of using a solid marking material it is possible to employ an ink deposited on the ground surface 2 by means of a metal ball.

Figure 6:
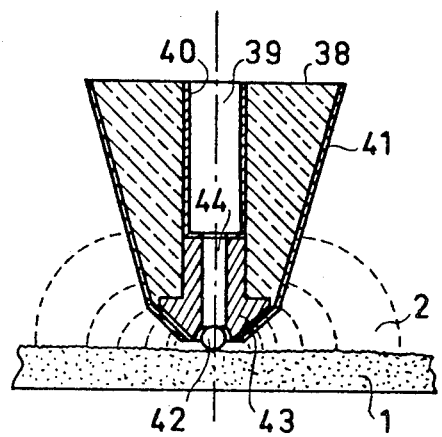
FIG. 6 a sectional view of the end of a ball stylus.

FIG. 6 is a sectional view of a ball tip or point making it possible to collect in punctiform manner the voltage induced at the passage of the elastic surface waves. The tip comprises a frustum-shaped nose 38 made from a dielectric material. An ink delivery duct 39 is connected to a metal bearing 43 having a spherical recess holding a metal ball 42. Duct 39 is connected to ball 42 by a capillary 44. A metal coating 40 on the side wall of duct 39 electrically connects the metal bearing 43 with the cable 14 in FIG. 1. The ink penetrates up to ball 42 and forms on the surface thereof an inking film which is renewed by rolling on surface 2. An outer metal coating 41 on the frustum-shaped nose 38 is earthed, so that it can serve as a counter-electrode. The ink can have an electrically insulating effect, because the alternating voltage induced can overcome the capacitance $C_b$ existing between ball 42 and bearing 43.

Figure 7:
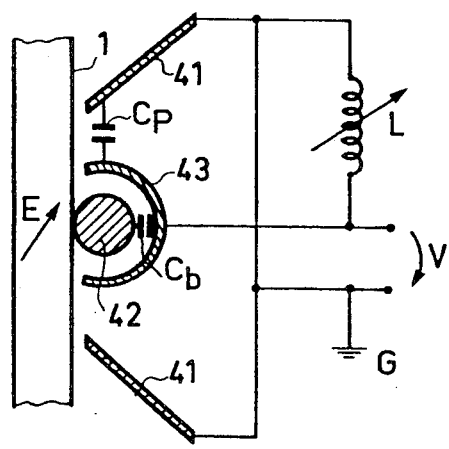
FIG. 7 an explanatory diagram.

FIG. 7 shows the equivalent circuit diagram of the tip of FIG. 6. The electrical field E produced by the dielectric plate 1 leads to an induced voltage V which is transmitted via capacitance $C_b$. The stray capacitance $C_p$ between the counter-electrode 41 and the bearing 43 can reduce the value of voltage V. An inductance L makes it possible to neutralize this stray capacitance $C_p$ at the operating frequency. As is shown by FIG. 6 the counter-electrode 41 is electrostatically coupled to the surface of plate 1 and through being connected to earth G serves as a shield.

The stylus tip can be constituted by a porous conical member, which is penetrated by capillarity by a fluid ink made electrically conductive. This conical member can be formed by nylon fibres joined by a binder. A metal wire serving as a potential probe can be arranged along the axis of the said conical tip. In this case there is no need for the ink to be electrically conductive.

The hitherto described devices use a piezoelectric plate, whereof the electric field induced by the passage of the elastic surface waves is detected.

Figure 8:
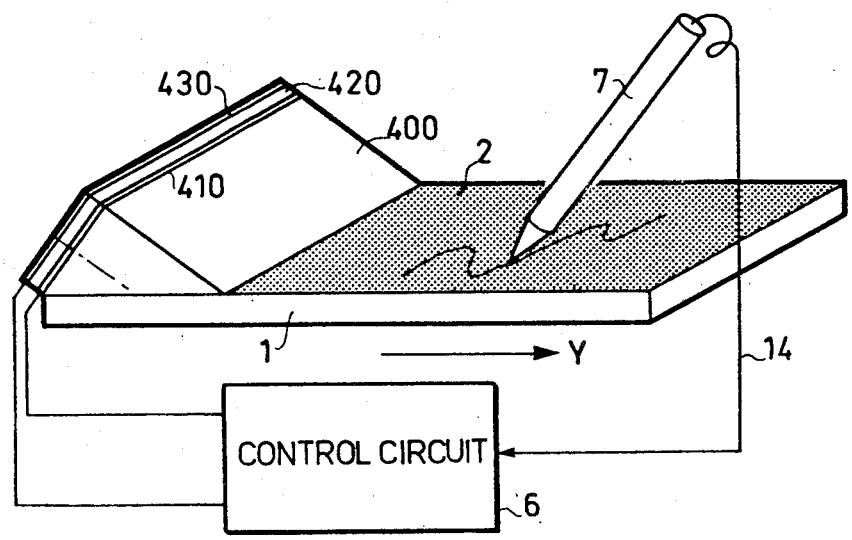
FIG. 8 a coordinate marking device with mechanical detection.
Figure 9:
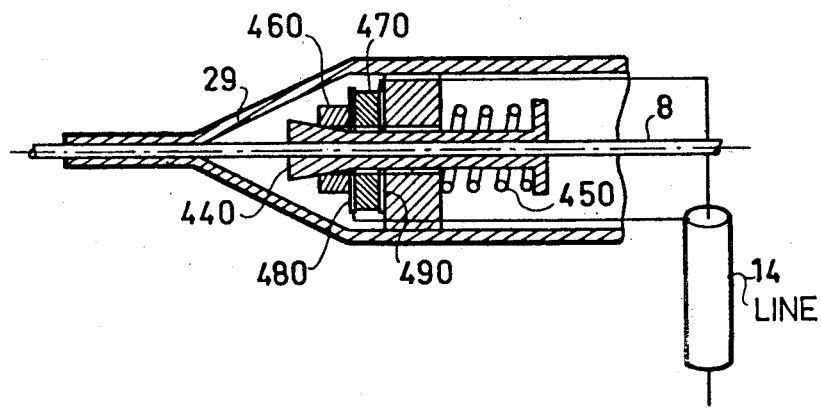
FIG. 9 the detail of an inscribing stylus with mechanical detection.

The invention is also applicable to the case when the plate used is not made from a piezoelectric material. In FIG. 8 a silica plate 1 is provided on the surface 2 from which elastic waves are radiated by a transducer means comprising an electromechanical transducer 410, 420, 430 associated with a coupling prism 400. The electromechanical transducer comprises a piezoelectric sheet 420 placed between two electrodes 410 and 430. The size of the sheet 420 or the polarization have been chosen in such a way as to radiate elastic volume waves into the coupling prism. The angle of incidence of the volume waves is chosen in such a way that the phase velocity of the wave fronts excited by surface 2 corresponds to the phase velocity of the elastic surface waves. Thus, the coupling prism 400 serves as a mode converter because it permits an energy transfer between the longitudinal or transverse volume waves and the elastic surface waves. The references 14 and 6 designate the same elements as in FIG. 1, except that the marking stylus 7 directly detects the passage of the electric surface waves. The mechanical detection of the passage of the elastic surface waves is brought about by equipping the stylus with an electromechanical transducer in the manner illustrated in FIG. 9. The end of the stylus has an elastic clamp 440, which is tightened in support 460 by means of a return spring 450. Tip 8 is firmly gripped by clamp 440 in such a way that the vibrations intercepted by said tip are transmitted to the piezoelectric transducer 470, 480, 490. The transducer comprises a ring 470 made from a piezoelectric material, equipped on its two annular faces with electrodes 480 and 490. The support 460 rests on face 480 and the transducer is fixed to the stylus body 29. The vibrations detected when tip 8 is in contact with surface 2 are applied to the piezoelectric transducer contained in stylus 7, which converts them into a voltage available at the terminals of coaxial line 14. It is also possible to obtain a ball stylus equipped with an electromechanical transducer by adopting a configuration very close to that of FIG. 9. In this case the ball support is mechanically connected to the electromechanical transducer.

What is claimed is:

1. A marking system using elastic surface waves comprising:
   a substrate for the surface propagation of linear wavefronts of said waves along a free surface in two separate directions with the vibratory energy propagating perpendicularly to said linear wavefronts, and having an uneven area with a depth significantly less than the wavelength of said elastic surface waves;
   an electro-mechanical transducer coupled to said substrate for producing said waves;
   excitation means connected to said transducer means for supplying pulses to excite said transducer means;
   a stylus having a tip adapted for movement over said surface in contact therewith including a member for feeding a marking substance to said tip to leave a mark on said surface as said tip is moved over said surface and transmitting a pulse induced in said tip by passage of said linear wavefronts of said elastic surface waves; and
   chronometric means connected to said excitation means and to said stylus for measuring the time taken by the elastic waves to reach the stylus of said two directions and thus the position of said stylus.

2. A system according to claim 1, wherein said substrate is a plate made from a piezoelectric material, said induced pulse being obtained by sensing of the electrical field generated close to said free surface in response to said vibratory energy.

3. A system according to claim 2, wherein the electromechanical transducer means comprise bulk wave transducers separated from said plate, the stylus being provided with an electromechanical transducer converting the vibrations collected by said tip.

4. A system according to any one of the claims 1 to 3, wherein the area of the free surface is an area roughened by grinding.

5. A system according to claim 1, further including optical projection means for projecting onto said area the image of a line carried by a support.

6. A system according to claim 1, wherein said marking substance is initially solid and electrically conductive, the member comprising a tip issuing from the end of a sleeve member.

7. A system according to claim 6, wherein said sleeve member is shielded by a conductive part serving as a counter-electrode for intercepting said pulse induced by the passage of said elastic surface wave.

8. A system according to claim 1, wherein the marking substance is an ink, the supply member being constituted by a metal ball forming the tip of said stylus.

9. A system according to claim 1, wherein the marking substance is an inking liquid, the supply member being a pointed member impregnated by capillarity and able to transmit by electrical conduction the induced voltage collected by its end in contact with said free surface.

* * * * *